Dec. 17, 1968  G. EINAUDI  3,416,210
METHOD OF MANUFACTURING NEEDLE BEARING CAGES
Filed July 26, 1966  2 Sheets-Sheet 1
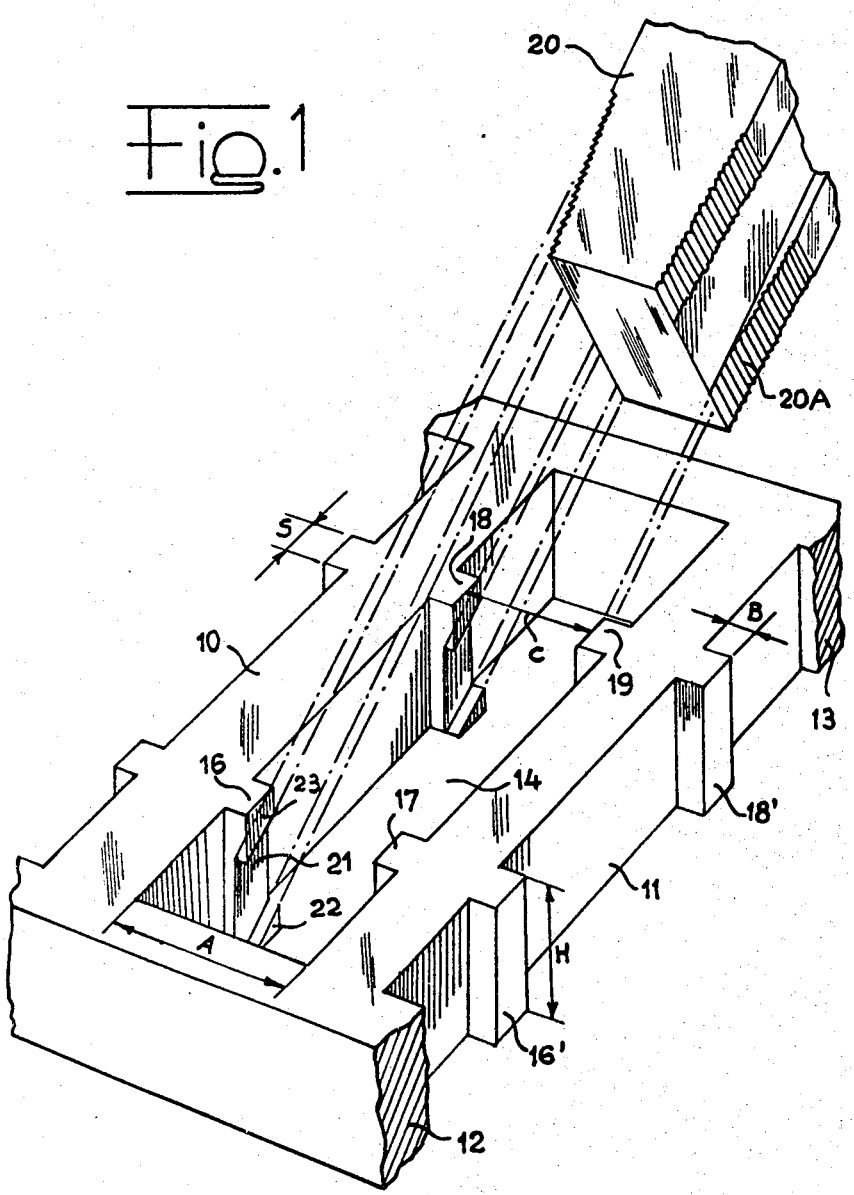

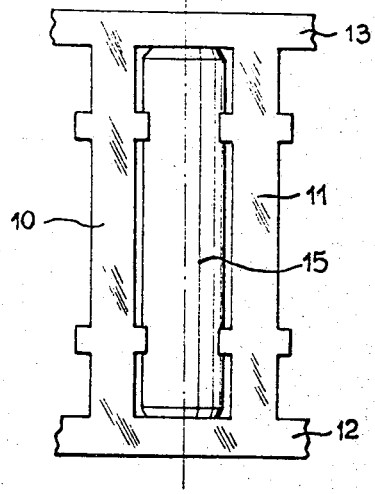
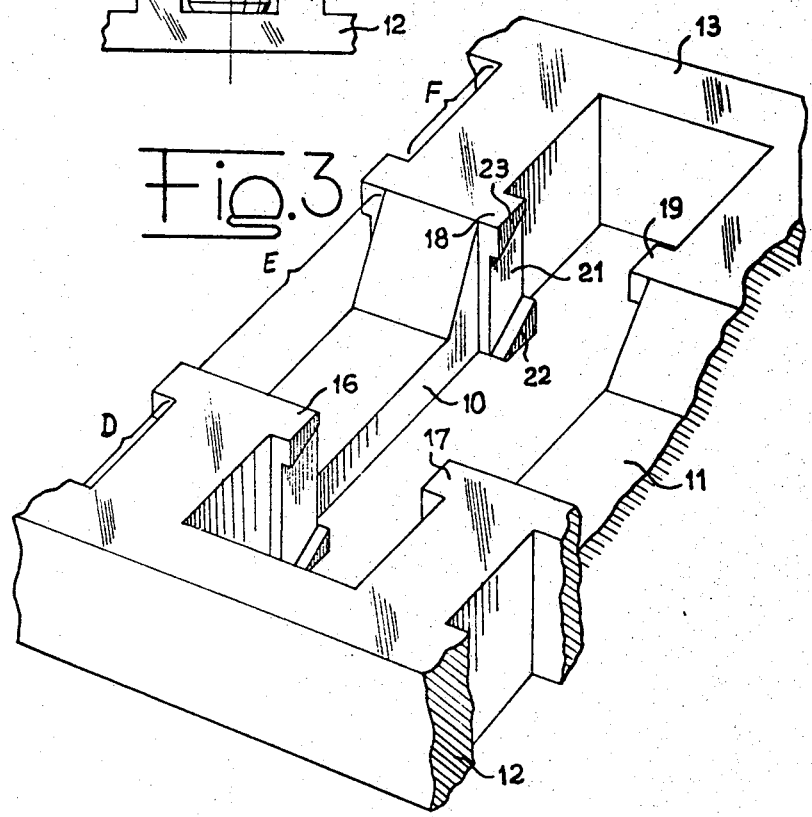

United States Patent Office 3,416,210
Patented Dec. 17, 1968

3,416,210
METHOD OF MANUFACTURING NEEDLE
BEARING CAGES
Giacomo Einaudi, Turin, Italy, assignor to RIV-SKF
Officine di Villar Perosa S.p.A., Turin, Italy
Filed July 26, 1966, Ser. No. 567,926
Claims priority, application Italy, July 31, 1965,
17,939/65
3 Claims. (Cl. 29—148.4)

This invention relates to the manufacture of roll cages of the so-called "solid"-type, as distinct from cages made of a sheet-metal stock.

More particularly, the invention is related under certain basic aspects with the method disclosed by my U.S. Patent No. 3,144,703, issued on Aug. 18, 1964, and is to be understood as an improvement of the patented method. For this reason, I understand the disclosure of the above-mentioned patent as making part of this description, i.e. with the view to not unduly repeat myself hereinafter as far as certain already disclosed details of the method are concerned with.

Briefly, my prior patent discloses a method of manufacturing a roll cage for a needle bearing of the character comprising a pair of solid end rings integrally interconnected by solid roll-separating bars defining roll-windows therebetween, and wherein each of the windows is formed at locations adjacent its end portions with a pair of chordal surfaces for guiding a respective roll on its assigned axial plane of the cage, each of said chordal surfaces having adjacent thereto a pair of circumferentially directed projections located at radially opposite sides of the pitch cylinder of the cage for radially retaining the rolls in the cage. The method disclosed by said patent expresses i.e. the idea of punching in a cage blank the roll-windows having end sections of a width greater than the roll diameter permitting passage of a slotting tool through said sections in a direction inclined to the geometrical axis of the blank, and slotting the flanks of the windows at locations between said end sections over a radially limited extent by passing the said tool in said direction through the window to thereby form said chordal surfaces. The roll-retaining means are automatically formed as parts being left intact by the slotting tool, said parts including a circumferentially enlarged portion on each bar intermediate the locations attacked by the tool, said parts including a circumferentially enlarged portion on each bar intermediate the locations attacked by the tool, in an arrangement whereby a whole longitudinally intermediate section of the window is of a width smaller than the diameter of the roll and is radially off-set with respect to the pitch cylinder thus preventing the roll from escape from that side.

It is an object of this invention to improve the above outlined method. More particularly, one object of the invention is to expedite the manufacturing process. Another object is to provide more efficiently distributed and shaped retainer means for the rolls. Yet another object is to provide a method yielding a "full thickness" cage, i.e. a cage having roll-separating bars of the same radial thickness as the end rings, so that the cage may be exactly guided in operation between the outer and inner runways of the bearing. Still another object of the invention is to limit the frictional contacts between the rolls and their guide- and retaining surfaces on the cage, without losing any of the advantageous aspects of my prior patented method. A still further object is to improve said method by the steps comprising forming each window in the blank with a width greater than the roll diameter, except for a pair of axially limited, circumferentially constricted regions or "throats," each of which is confined between a pair of mutually opposing chordal ribs on the window flanks, and forming the chordal roll-guiding surfaces and the roll-retaining projections by slotting each rib by means of the hereinbefore mentioned slotting tool to a depth smaller than the extent by which the rib protrudes from its respective bar into the window.

Further objects and advantages of the invention will result from the foregoing description, in which reference is made to the accompanying drawings wherein:

FIGURE 1 is a perspective part-view of a cage blank and slotting tool in an embodiment of this invention;

FIGURE 2 is a fragmentary plan view of a cage obtained according to the embodiment shown in FIGURE 1, with a roll assembled in a window;

FIGURE 3 is a view similar to that of FIGURE 1, referring to a modification of the latter.

In the two embodiments shown in the drawing similar reference numerals have been used to indicate similar or equivalent parts, FIGURE 1 shows a region of one of the roll windows 14 of a cage for a needle bearing, said region comprising a pair of roll-separating bars 10, 11 integral with opposite end rings 12, 13. The cage can be made of metal or of a suitable synthetic resin capable of being machined.

To obtain the cage, a blank in the form of a bushing is used, in which the roll-windows are formed by means of a radially guided punchnig tool, according to the principles known in the art.

According to this invention, each of the windows 14 is rectangular in plan view, its width A being greater than the diameter of the roll 15 (see FIG. 2) to be inserted into the window, except for a pair of constructed regions or throats formed each by a pair of mutually opposed chordal ribs left by the punching tool to protrude by an extent B from the flanks of the window, the width C of said throats being smaller than the diameter of the roll 15.

The pairs of ribs pertaining to the window 14 in FIG. 1 are denoted by 16, 17 and 18, 19, respectively and have been shown in their already slotted condition. However, the configuration of the ribs just after punching step results from the representation in FIG. 1 of the ribs 16' and 18', pertaining to a window next to the window 14 shown, from which it will be seen that each of the ribs has originally a shape of a parallelepiped forming a sort of jamb on the flank of the window. Owing to their origin (radial punching), the ribs extend parallel to each other and to the axial mid-plane P (FIG. 2) of the window. Each of the ribs has a thickness S (measured axially of the cage) which is a small fraction only (advantageously less than ⅒) of the axial length of the window. It will be also seen in FIG. 1 that the radial thickness H of the cage is constant throughout the length of the latter; in other words, the cage shown in FIG. 1 is a "full thickness cage."

The cage blank obtained from the window-punching step is then placed on an indexing head (not shown) and the windows are sequentially machined to provide therein the roll-retaining projections. In the embodiment shown, a double, bilaterally cutting slotting tool 20 is used, arranged to perform to-and-fro working strokes through a window on the mid-plane P of the latter at an angle of 30°–60° to the axis of the cage. The tool is dimensioned in a manner that, in its operative condition each of its four cutting zones 20A is pointed towards an intermediate region of the height H of the respective rib 16, 17, 18, 19, in order to remove the material from said region to a depth smaller than B. In this manner, a single to-and-fro stroke of the tool is sufficient to simultaneously slot the opposing faces of the ribs in each of the pairs 16, 17 and 18, 19, leaving intact at the opposite ends of the ribs roll-retaining projections 22, 23 of a generally triangular profile. Due to the hereinbefore described setting and operation of the tool 20, the bottom surfaces 21 of the slots formed in the ribs are parallel to the mid-plane P. The cutting depth of the tool is predetermined in a manner such that the mutual distance of the bottom surfaces 21 in each pair of ribs corresponds to the diameter of the roll 15, with the usual allowance necessary for a smooth guidance of the roll between said surfaces once the roll has been snap-inserted into its window according to the conventional practice.

It will be seen from the foregoing description that, with the improved method of manufacture, the separating-bar portions situated between the pairs of ribs and outside of said pairs have no influence on either the guide or retention in place of the rolls 15. With reasonably small values of the width S of the ribs the frictional contact between the rolls and cage can be reduced to the most favourable values for their respective materials while, at the same time, owing to reduced contact zones, the lubricant film enveloping the rolls in operation of the bearing will not be appreciably scraped off the rolls. Generally, referring to the full thickness H (which is also the length of the ribs measured in their chordal directions), the thickness S of the ribs should advantageously amount to from $\frac{1}{10}$ to $\frac{4}{10}$ the value of H.

If necessary or desirable (e.g. in order to obtain a light-weight cage), the radial thickness of the roll-separating bars can be reduced in the zones situated axially outside and/or inside with respect to the constructions or throats. Such zones are denoted by D, E and F in FIGURE 3. In the embodiment shown in FIG. 3 the median zone E only has been reduced. The reduction is performed before punching operation, by correspondingly turning the bushing-shaped blank on a lathe and thereafter punching out the windows and slotting the ribs. The turning operation can be carried out from the radially outer side of the blank (the cage shown in FIG. 3 has been obviously obtained in this manner) or from the inside or else from both sides, provided the full thickness H is preserved in the rib-carrying regions and, advantageously, in the end ring regions 12, 13.

What I claim is:

1. In the method of manufacturing a roll cage for a needle bearing of the character comprising a pair of solid end rings integrally interconnected by solid roll-separating bars defining roll-windows therebetween, and wherein each of the windows is formed at locations adjacent its end portions with a pair of chordal surfaces for guiding a respective roll on its assigned axial plane of the cage, each of said chordal surfaces having adjacent thereto a pair of circumferentially directed projections located at radially opposite sides of the pitch cylinder of the cage for radially retaining the rolls in the cage; said method comprising punching in a cage blank the roll-windows having end sections of a width greater than the roll diameter permitting passage of a slotting tool through said sections in a direction inclined to the blank axis, and slotting the flanks of the windows between said end sections over a radially limited extent by passing the said tool in said direction through the window to thereby form said chordal surfaces;

the improvement comprising forming each window in the blank with a width greater than the roll diameter, except for a pair of constricted regions, each of which is confined between a pair of mutually opposing chordal ribs on the window flanks, and forming the said chordal roll-guiding surfaces and the roll-retaining projections by slotting each rib by means of said tool to a depth smaller than the extent by which the rib protrudes from its respective bar into the window.

2. The improved method of claim 1, comprising punching the windows in a cage blank having a radial thickness constant throughout its length.

3. The improved method of claim 1, comprising, as operation preliminary to the window-punching step, reducing the blank thickness over an axially extending zone located out of the projected restricted regions of the windows.

References Cited

UNITED STATES PATENTS

| | | |
|---|---|---|
| 2,765,518 | 10/1956 | Lovell et al. |
| 3,080,639 | 3/1963 | Maurizi et al. ____ 29—163.5 X |
| 3,114,960 | 12/1963 | Einaudi. |
| 3,144,703 | 8/1964 | Einaudi et al. _____ 29—558 X |

THOMAS H. EAGER, *Primary Examiner.*

U.S. Cl. X.R.

29—558, 163.5